United States Patent
Hesch

(10) Patent No.: US 6,435,433 B1
(45) Date of Patent: Aug. 20, 2002

(54) DEVICE FOR TREATING OF PROCESSING AND ESPECIALLY FOR DISINTEGRATING OF SUBSTANCES OR COMPOUNDS

(76) Inventor: Rolf Hesch, Steinkamp, 32657 Lemgo-Lüerdissen (DE)

(*) Notice: Subject to any disclaimer, the term of this patent is extended or adjusted under 35 U.S.C. 154(b) by 0 days.

(21) Appl. No.: 09/521,603

(22) Filed: Mar. 9, 2000

(30) Foreign Application Priority Data

Mar. 9, 1999 (DE) ........................................ 199 10 208

(51) Int. Cl.$^7$ ............................................. B02C 13/28
(52) U.S. Cl. ............................... 241/186.35; 241/188.1
(58) Field of Search ........................... 241/188.1, 188.2, 241/36, 189.1, 186.35

(56) References Cited

U.S. PATENT DOCUMENTS

| | | | |
|---|---|---|---|
| 3,823,919 A | * 7/1974 | Benedikter | 241/188.1 |
| 3,894,695 A | 7/1975 | Benedikter | |
| 3,960,334 A | 6/1976 | Wudyka | |
| 4,093,127 A | * 6/1978 | Alberts et al. | 241/275 |
| 4,641,791 A | 2/1987 | Cermanov et al. | |
| 4,747,551 A | * 5/1988 | Shagarova et al. | 241/188.2 |
| 5,230,475 A | * 7/1993 | Gerner | 241/186.35 |

FOREIGN PATENT DOCUMENTS

| | | |
|---|---|---|
| DE | 560 743 | 10/1932 |
| DE | 37 03 309 | 9/1988 |
| EP | 0 164 562 | 5/1985 |
| EP | 0 367 255 | 5/1990 |
| EP | 0 491 673 | 6/1992 |

* cited by examiner

*Primary Examiner*—Mark Rosenbaum
(74) *Attorney, Agent, or Firm*—Browdy and Neimark, P.L.L.C.

(57) ABSTRACT

A device to treat or process and especially to disintegrate materials and compounds characterized by a rotor, to which mentioned materials are fed axially. The rotor centrifugally accelerates the input material to a tool ring rotating around the rotor preferably in opposite direction, in which the tools are arranged radially. The tools of the tool ring intercept the highly accelerated material in flight and induce an extrem shear and bending strain effecting that the material disintegrates at it's natural weak point. The tools are arranged at the circumference at such distances that a laregely open circumference is established. That effects that the disintegrated components of the material can be discharged from the device after the impact without any hindrance even if the material is wet or sticky. The degree of impact of the tools on the material can be adjusted by the regulating parameters. That offers a large field of applications to disintegrate and separate raw materials and waste materials consisting of physically sufficiently different components into their individual components.

14 Claims, 2 Drawing Sheets

DEVICE FOR TREATING OF PROCESSING AND ESPECIALLY FOR DISINTEGRATING OF SUBSTANCES OR COMPOUNDS

BACKGROUND OF THE INVENTION

Substances and compounds containing fibers of different characteristics are of special interest. For disintegrating such materials and compounds numerous devices are known such as crushers, granulators, defibrators and so on. Apart from knife ring flakers in the first instance, wing beater mills, hammer mills, shredders and derivations thereof must be mentioned.

Wing beater mills, cross stream mills and double stream mills have as a main characteristic a rotor and, as a functional counterpart, a screen or friction ring or a combination of both encircling the rotor as a whole. The raw material to be disintegrated is fed axially to the rotor and centrifugally accelerated by the rotor blades towards the surrounding screen or friction ring. Wear plates fixed to the ends of the rotor blades drag the material to be milled along the surrounding screen oror friction ring, until it is disintegrated to an extent that it is able to pass through the screen perforations. The screen perforations are the bottle neck of the system. The smaller they are, the more often the material has to be dragged by the rotor along the surrounding screen or friction ring, until it is sufficiently disintegrated to be able to pass through the perforations. The smaller the perforation, the more times the material to be ground has to be dragged along the screen ring, until it is sufficiently disintegrated and can finally pass through the screen holes. The output drops correspondingly and the energy consumption increases. If friction rings are employed instead of screen rings, the sufficiently disintegrated material has to leave the milling zone via the lateral slots between the rotor blades and the friction ring. They are bottle necks, too. Their negative effects are the more serious, the more finely that the material is to be disintegrated and the higher its moisture content.

With very moist or even sticky materials, the machines mentioned above fail entirely since the screen holes or lateral slots get plugged and the function of the machines breaks down. As a result, these machines are generally only used for disintegrating materials having a moisture content between 1 and 5 %, referred to dry matter, for example as chip disintegrators in particleboard manufacture. But dry wood flakes with 1 to 5% moisture content, are extraordinary brittle. When being disintegrated to fine flakes or even micro flakes, as required for good surface layers in particleboard manufacture, they do not break as desired in the longitudinal sense parallel to the main axis, but because of their high brittleness they break several times in an unfavourable manner transversely, resulting in a poor ratio of slenderness (length:cross-section). A poor ratio of slenderness again results in poor values for bending strength and poor homogeneity of the board surface. In contrast, moist wood is flexible and tough. It breaks preferably at points of natural weakness, for example in the vascular vessels or in the soft spring wood. The number of undesired transversal ruptures drops sizeably. A flake of favourable dimensions and high ratio of slenderness, i.e. a long and thin flake, emerges, as required for boards of high bending strength and good surface quality.

SUMMARY OF THE INVENTION

It is the aim of the invention to separate materials as well as waste materials consisting of at least two or more physically sufficiently different components into their individual components. It is also an aim to disintegrate structures as for example pulp fibers in a paper sheet to their original components, which means into pulp fibers. It is also an aim to execute such disintegration as carefully as possible in order to preserve the original sizes of particles, length of fiber and so on, in order to be able to repeat recycling operations as often as possible. An additional aim is to execute such disintegrating operations in all ranges of moisture and even in fluid suspensions or with sticky materials or when adding sticky additives. Furthermore, heat development shall be kept as low as possible in order to avoid evaporation of volatile materials.

EMBODIMENTS

The basic idea of the invention consists in a combination of several measures. In contrast to all machines according the state of the art, the tool ring according invention has a distinctly "open circumference". This has to be understood as the ratio of gaps between the tools referred to the total circumference of the tool ring. This is the basic precondition for avoiding plugging even with moist and sticky materials.

Example

The total of all gaps between the tools is 4.100 mm. The total circumference is 5.100 mm. Then the "open circumference" is 80,4 %. That means that 80,4% of the circumference is entirely open, so that material can pass through without any hindrance.

Machines corresponding to the state of the art have an "open circumference" of only 25 to 45%.

Another important feature of machines according to the invention is the "large clear span" between one tool to the next being 15 to 25 times larger than with any comparable machine of the state of the art. Screen perforations with machines according the state of the art range between 1,5 to 3,0 mm for so-called "Conidur screens". "Slot screens", as employed for example for producing micro flake surfaces in particleboard manufacture have slots in the range of 1,5×15 mm to 3,0×30,0 mm. In contrast, the free spaces of the machine according to the invention range between 40×400 mm to 55×500 mm, depending on the size of machine. That means that the size of particles of material fed into machines according the state of the art is a multiple of the size of screen perforations and therefore the material has to stay on the screen until it is entirely disintegrated. Even the disintegrated material is still larger than the screen perforations, so that the danger of plugging remains persistent, especially with moist material.

The situation is entirely different with the machine according to the invention: Here the free span from tool to tool is in general larger than the lengths of the input material. At a free span between the tools of for example 40 to 50 mm, no piece of the input is able to set and rest on the tools. Even with material of greater length such risk does not exist, as the high centrifugal force effects that long pieces sag and are flung through the gap between the tools. Last but not least, the machine according to the invention is constructed with shearing knives fixed to the rotor with the objective to shear off any build up of material on the tools greater then about 2 mm.

The principle of operation of the machine according the state of the art as well as the one according the invention is based on the radial acceleration of the input material. The tools according to the invention are rotated with a relative speed preferably between 30 and 100 m/sec around the rotor. The working edges (3.5) of the tools (3.3 . . . 3.6) intercept the radially accelerated material in flight more or less at a right angle and effect that the material bends around the working edges. Thereby, in each piece of input material, impulse-like bending and shearing strain are produced, which effects that the material is disintegrated at its weakest point or layer. Such weak points are for example spring wood, vascular vessels and parenchymatic tissue of the wood as well as natural tension and drying fissures, but also jointing points of elements of the same material, like particles in particleboard.

Machines of the state of the art are fixed by the supplier to a certain rotation speed in accordance with trials executed to determinate the optimal speed before delivery. Normally such speed is not subsequently changed. The determining parameters for the degree of disintegration are in the first instance the size of the screen perforations, the distance between the wear plates of the rotor and the screen or friction ring, the profile of the friction ring and its orientation. The output of the machine is a function of the selected screen or friction ring without a further possibility of adjustment or control.

The machine according invention is entirely different in design, control and possibilities of adjustment: Here the main adjusting parameters are the circumferential speeds of rotor (2) and tool ring (3) or of the working edge (3.5) of the tools (3.4 . . . 3.6). That's why the motors of both rotor (2) and tool ring (3) are normally equipped with frequency converters enabling to adjust the speed continuously.

High speed effects a high degree of disintegration and a high output. Low speed means a low degree of disintegration and lower output.

Further means of control are modulating the speed of the rotor (2) or the speed of the tool ring (3) independently from each other. In general rotor (2) and tool ring (3) are rotated in opposite directions. But for certain applications rotating in the same direction at different speeds can yield favorable effects.

Another control parameter of the machine according invention is the quantity and speed of air passing through the machine. Both rotor (2) and tool ring (3) act as radial fans and generate about 3 to 6 times as much air as machines according to the state of the art. The reason for this is the large "open circumference" of the tool ring (3), which does not throttle the air generated by the rotor (2).

Huge quantities of air passing through the machine at high speed result in scavenging the machine of disintegrated material within fractions of a second.

A special throttling device (6) at the inlet of the machine serves to adjust the quantity of air entering the machine over a continuous range. The throttle consists of at least one pull in belt (6.1) and a cross section adjustment plate (6.2), which can be replaced by a second pull in belt. This does not only limit the intake of air, but also reduces the speed of air and consequently the dwell time of the material in the machine. That again determines the throughput.

Another control parameter is the height of the tool (3.4) in the tool ring (3). There is a minimum of tools (3.6) of about ¼ to ⅙ that must have a large height in order to guaranty a high transversal stiffness of the tool ring (3). They must be welded to the ring (3). The rest of the tools (3.4) are executed as interchangeable ones. Their height is selected in accordance with the technical requirements of the individual application. Tools (3.4) with a large height act like blower blades. The more of them that are installed in the tool ring (3), the greater the generation of air and the air velocity. If less air shall be generated, interchangeable tools (3.4) of low height must be installed.

DETAILED DESCRIPTION OF THE INVENTION

Figure 1:
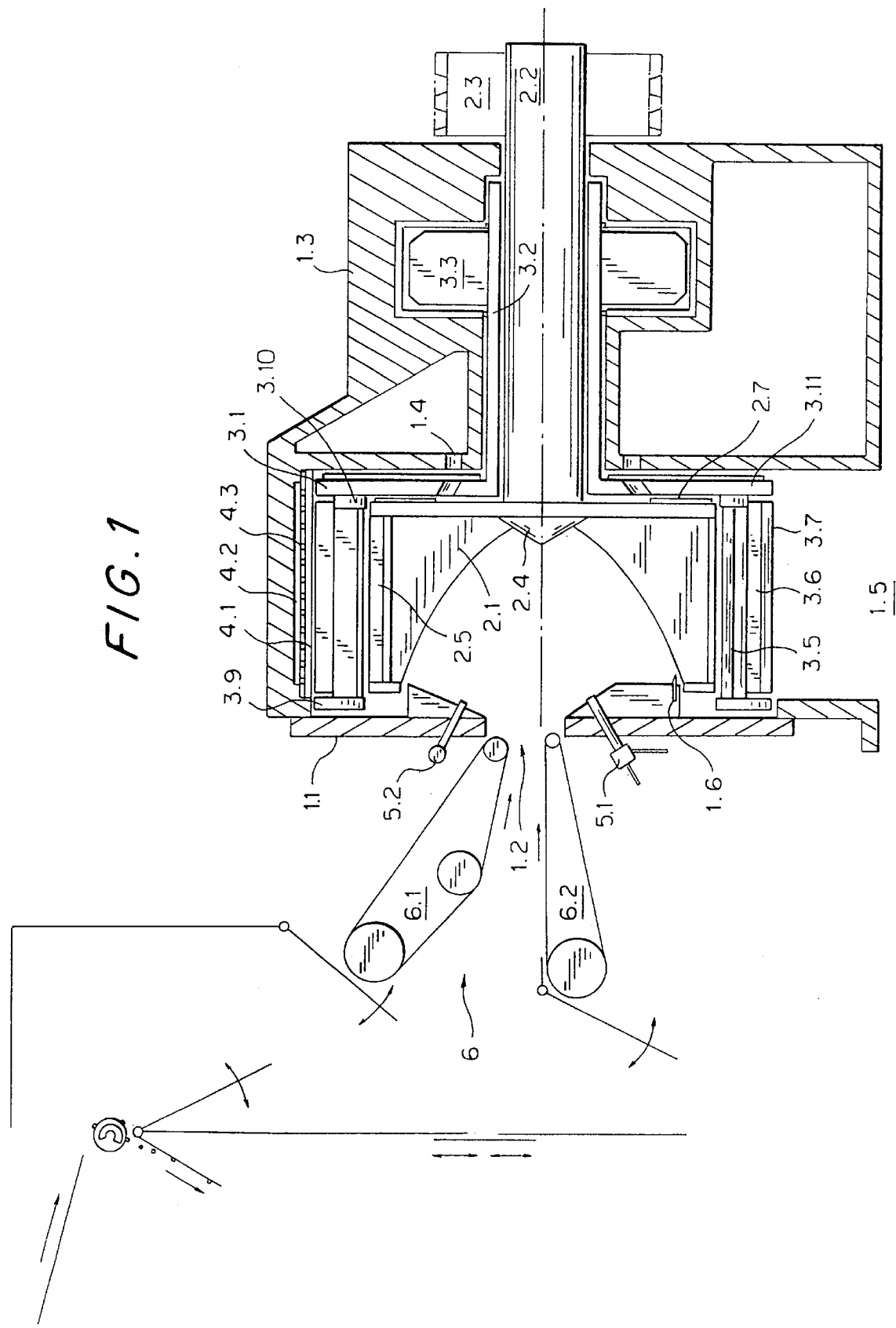
FIG. 1 shows a longitudinal section through a plane perpendicular to the plane of FIG. 2.
Figure 2:
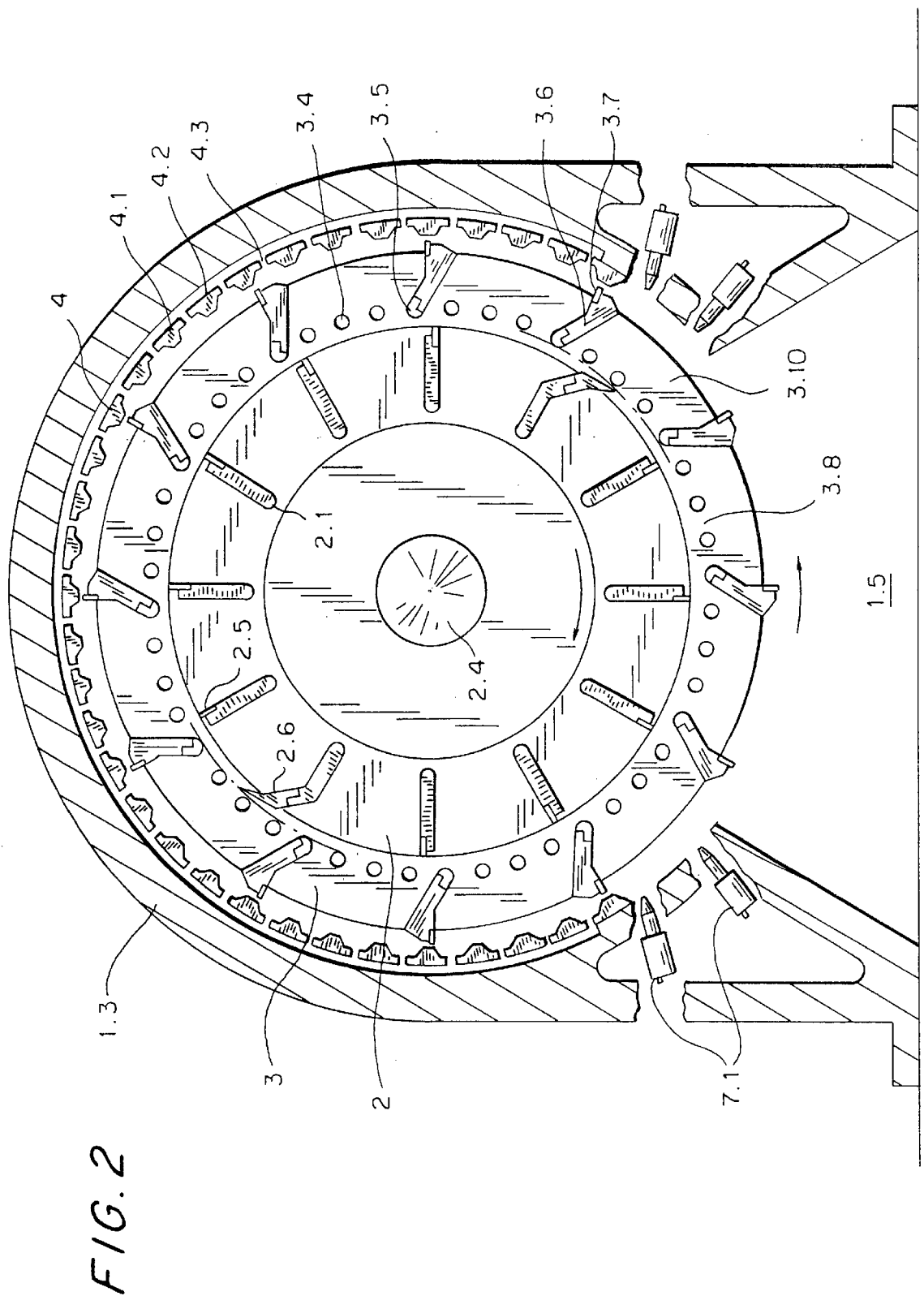
FIG. 2 shows a cross-section through a plane perpendicular to the plane of FIG. 1

The device according to the invention that is shown in FIGS. 1 and 2 includes a housing that is preferably made of parts that are welded together. A front door (1.1) serves to open the machine for changing the tools, for taking out rotor (2) and tool ring (3) for repair work and for installing a friction ring (4) when required for special applications. A material feeding chute (1.2) is integrated into the front door (1.1). A heavy pillow block (1.3) for the drive shaft of the rotor (2.2) and the tool ring (3.3) is situated at the rear side of the machine (2.3) represents a V-belt disc sitting on the shaft (2.2) of the rotor (2). The rotor (2) consists of a multiple of rotor blades (2.1) the function of which is to give a high radial acceleration to the material to be disintegrated. Before touching the rotor blades (2.1) the input material crashes first against the distributing cone or disc (2.4) which distributes it equally over the whole circumference. Wear blades (2.5) are fixed to the ends of the rotor blades (2.1). They act at the same time to prolong the acceleration path. In order to avoid that long pieces of input material twist around the tools and build up, at least one shear off or cleaning knife (2.6) is fixed to the end of one rotor blade instead of a wear blade. In order to avoid that material enters the narrow gap between rear side of the rotor (2) and base disc of the tool ring (3), where it could produce friction and cause fire, radially arranged ribs (2.7) produce scavenging air, which is centrifugally accelerated. This air keeps the gap clean.

Tool ring (3) consists of a base disc (3.1), a hollow wheel for the drive (3.2), a mechanical or hydraulic drive (3.3) and two types of tools. The first type is an interchangeable tool (3.4) which can be executed in any suitable geometry and height. The second type of tool or large tool carrier is not interchangeable but welded in between base disc (3.1) and counter ring (3.9) in order to give the necessary transversal stabilty to the tool ring (3). The working edges of the large tool carriers (3.6) are always replaceable. The exchangeable tools (3.4) are provided in two executions, one with replaceable working edges (3.5) and another without. Here the tool carrier incorporates the working edge and is replaced as a whole after being worn out.

At the rear side of the large tool carriers (3.6) upset and wear plates are installed when working with the friction ring (4).

One of the main characteristics of the machine according invention is the extremely wide "open circumference", which means a large free passage between two adjacent tools in relation to the distance between their center lines. This feature explains why the machine cannot get plugged either with wet material or with sticky material.

When changing tools or executing repair work, the tool ring (3) is taken out of the machine as a whole. For easy connection with the base disc (3.1) a connecting ring (3.10) is provided, which is connected with the base disc (3.1) by heavy screws.

Ribs (3.11) at the rear side of the base disc (3.1) are provided to produce scavenging air to keep the space between the machine housing and base disc (3.1) clean.

If further disintegration is desired, friction ring (4.1) can be installed in the machine housing. The already disintegrated material flung through the open circumference (3.8) lands on the friction ring (4). The friction ring (4) consists preferably of cast iron profile elements to exert friction when the material is drawn along it. For this purpose the wear plates (3.7) must be installed on the large tool carriers (3.6) to move the material along the friction ring and effect the further disintegration.

A channel system (4.2) serves to feed fluids, additives, and cooling or drying medium through the friction ring (4) into the material being milled. For this purpose perforations are provided in the friction ring (4) as continuations of the channel system (4.2).

If additives shall be added to the input material while being disintegrated, special devices are provided for liquid additives (5.1) and dry matter/powder additives (5.2).

Air quantity and air velocity belong to the essential regulating parameters. They are controlled by the air throttle (6). The throttle consists of an upper pull in belt (6.1) and a counter plate (6.2) or upper and lower pull in belts with adjustable cross sections and pull in speeds.

Last but not least a tool cleaning device (7.1) is provided to clean the tools by pressurized air or pressurized liquid.

The material is aspirated by the high draft of air generated by rotor (2) and tool ring (3) through the inlet chute (1.2) and flung against the distribution cone or disc (2.4), which again accelerates and distributes it radially to cross the orbit of the tools (3.4 ... 3.6) so that an intensive impact can take place. The rotor blades are equipped at their end with wear plates (2.5). At least one wear plate is replaced by one shear off or cleaning knife (2.6) in order to keep the tools (3.4 ... 3.6) clean and cut or shear off long pieces of material twisting around the tools.

The tool ring shown in FIG. 2 consists in this case of 12 welded in large tool carriers (3.6) with round working edges (3.5) The number of large tool carriers depends on the size of the machine. The geometry of the working edges (3.5) depends on the type of material and application.

The interchangeable tools (3.4) as shown in the FIG. 2 are of simple execution consisting of round iron bars, only. As soon as they are worn out, they are replaced by new ones. If a more sophisticated geometry with more expensive tools is required the interchangeable tools are also executed in two parts, i.e. tool carrier (3.4) is exchangeable working edge (3.5).

The elements of the friction ring (4.1) are available in many profiles for intensive disintegration as well as for preserving disintegration. The channel system (4.2) behind the friction ring serves to cool the friction ring (4.1) when the necessity arises for example when processing materials with volatile ingredients. The channel system can also serve to add additives via the perforations (4.3) directly into the material being processed. Cooling air or hot air for drying can also be injected.

With the injecting devices 7.1 pressure air or pressurized fluids can be injected to clean the tools or to add additives.

The disintegrated material has to be discharged and transported by pneumatic conveying. The material is more or less radially flung into the pneumatic duct underneath the outlet (1.5) of the machine to be conveyed to the cyclone or similar air separator.

In the mill like machine housing (1) two main aggregates are incorporated, namely rotor (2) and tool ring (3). The function of the machine is performed in the first instance by the tool ring (3). Tool carriers (3.6) are welded between the base disc (3.1) of the tool ring and the counter ring (3.9). They have a large height in order to guarantee a high moment of resistance and sufficient stiffness of the tool ring even at high rotation speed. The welded in tools are made preferably wedge shaped at their outside edge, in order to provide a slim working edge necessary to perform an effective function with respect to disintegrating the input material and to guarantee at the same time by the broader outer edge of the tools a high stiffness of the tool ring over the tangent.

The majority of the tools or tool carriers (3.4) is interchangeable. They are plugged or screwed in. They can be made with or without interchangeable working edge or wear piece (3.5). By the possibility of interchanging, a very high degree of versatility and flexibilty is achieved with respect to the different fields of application. If, for example, a high degree of disintegration with dry input material is to be achieved, for which a high throughput of air is not required, then the interchangeable tools (3.4) can consist of simple round bars with a small radius of 5mm, for example The small radius effects a high deflection of the input material when being intercepted by the rotating tool resulting in high bending and shear strain which again effect the disintegration. Due to their low specific surface, the round bars do not produce a high ventilation effect in the machine. The quantity of air produced by the round bars is sufficient when disintegrating dry material since this is easily discharged from the machine. If, in contrast, moist or even sticky material shall be disintegrated or mixed, then a high air generation of the machine is required, in order to support the centrifugal force for discharging the material from the machine and avoiding caking. For such purpose tools (3.4) having a large height are plugged or screwed in. They act as blower blades and produce the required large quantity of air. The higher the quantity of air and the higher the air velocity, the more thorough the discharging of the disintegrated material even if humid or sticky. The machine is literally blown clean.

The tool carriers (3.4) and (3.6) can be equipped with interchangeable elements (3.5) with different working edges. This also aims to provide the machine according invention with a maximum of versatility with respect to being adapted to the different fields of application. As described already, a small radius of the tools produces high bending and shear strain in the material, which results in an intensive disintegration. Increasing the diameter of the radius results in a less intensive and more material preserving disintegration, as may be preferred when working with very dry and brittle input material. Thus, undesired shortening of the material can be avoided. The other extreme is sharp edged knife like tools as applicable for the recycling of composites containing reinforcing fibers or the like. The possibility to replace the working edges (3.5) is furthermore necessary since they are subject to wear and must be replaced from time to time by new ones.

The input material is fed into the machine via the feeding chute (1.2) in the front door (1.1) of the machine more or less centrally to the distributing cone/disc (2.4) of the rotor 2 which distributes the material centrifugally to the rotor blades (2.1). The rotor blades have the essential function to enhance the acceleration and to propel the material against the working edges (3.5) of the tools.

Rotor (2) and tool ring (3) rotate preferably in opposite directions. The rotation of the rotor (2) covers the range of 400 to 4.000 rpm, preferably 400 to 1,500 rpm. The tool ring (3) rotates in the range from 0 rpm to 4,000 rpm, preferably between 200 and 2,000 rpm. But rotor (2) and tool ring (3) can also operate in the same direction. Rotor (2) propels the input material with high speed radially. Thereby it has to cross the orbit of the tools (3.4 and 3.6) at a right angle. In correspondence with the rotation speed it is more or less completely intercepted by the working edges (3.5) and subject to highly intensive bending and shear strain resulting in disintegration by rupture in the weak zones, as for example spring wood. High rotation speed yields almost complete intercepting of material at extremely high energy induction. As result, an almost complete and very intensive disintegration is achieved. In contrast, low rotation speed of the tool ring yields an incomplete disintegration and a low degree of disintegration as desired for several applications. Mentioned effects can be adjusted continuously by adjusting the rotation speed of rotor (2) or tool ring (3) or of both. For applications, where an extraordinarily high degeree of disintegration/ defibration is aimed for, as for example micro particle surface layers in particleboard manufacture, the integration of a friction ring (4) encircling the tool ring (3) is provided as an option. In general it encircles the tool ring (3) by around 3/4 of its circumference. In contrast to machines according the state of the art, such friction ring is not responsible for the intrinsic disintegration. Furthermore, in contrast to machines of the state of the art, the material does not effect as many revolutions as necessary to be able to pass through the slot between wear plates of the rotor and friction ring, but about ¾ revolution only. If further disintegration is desired, the friction ring can also be executed as a ¹⁄₁ ring in order to allow to perform several revolutions. Then the discharge of material is effected laterally of the friction ring (4) in the section of the outlet of the machine (1.5), while with machines according the state of the art the discharge is done over the full circumference.

As the machine according invention cannot get plugged due to its large "open circumference" and due to the large quantity of air passing through, dry and liquid additives can be added to be homogeneously mixed with the material. Feeding devices for liquid additives (5.1) and solid ones (5.2) are provided.

Examples of Fields of Application

The subsequent examples shall demonstrate the wide range of applications of the machine according invention without limiting it.

The examples cover the fields of "defibration", "disintegration" and "blending/ mixing" referring to specific materials as input.

The examples shall serve specially the purpose to show to the professional how to adjust or to modify the machine in accordance with details shown by FIGS. 1 and 2 in order to achieve the desired results and advantages.

Disintegration of Wood Flakes

It has been mentioned already that for particleboard manufacture, long, slender fine or microfine flakes are desired for surface layers which cannot be produced until now under economic conditions. Flake disintegrators according the state of the art can only disintegrate dry flakes. At elevated moisture content they get plugged. Furthermore dry flakes/chips are brittle and therefore break while being disintegrated transversally, thus resulting in unfavorably short lengths.

The machine according invention is not sensitive at all to moisture due to the large "open circumference". It has no problems to disintegrate flakes/chips having a moisture content of 40% after flaking or even more. As the disintegration is effected by high bending and shear strain at zones of natural weakness and due to the fact that moist flakes are plastic and flexible, transversal ruptures do not prevail. As a result, long and slender fine or micro flakes are achieved being ideal for the manufacture of particleboard with very homogenous surfaces and high bending strength.

If a fine particle with a high ratio of slenderness is to be achieved, the bending strain at the working edge (3.5) of the tools (3.4 . . . 3.6) has to be kept moderate, since elevated strain provokes transversal ruptures. For such purpose tools with large radius must be plugged in, since a large radius produces a more moderate bending strain. The rotation speed of the rotor (2) and tool ring (3) have to be adjusted to 600 to 800 rpm, both rotating in opposite directions. If, in contrast, a very intensive disintegration is desired even at the sacrifice of less favorable lengths, a working edge (3.5) with small radius or even knife like geometry has to be employed, in order to achieve high bending and shear strain resulting in ruptures at the weak points, preferably in the sense of fiber. The degree of disintegration can further be boosted by increasing the rotation speed of rotor (2) and tool ring (3) to about 1000 to 1,500 rpm, each. Further increases in the degree of disintegration are possible by throttling the air throttle (6) in order to reduce the flow of air in the machine and thus increase the dwell time of the material in the machine. For ultimate intensification of disintegration the friction ring (4) can be installed into the machine. A series of friction profiles permits a large choice of disintegration intensities up to almost powder.

Recycling of Particleboard

According the state of the art, waste particleboard is chopped or shredded and then fed to a digester to be treated by steam in order to weaken the glue joints. Then the flakes can be recycled for particleboard manufacture. However, the method can only be applied for boards made with resins, which dissolve or weaken under the influence of moisture. It does not work with phenolic resins, for example. The process is furthermore expensive.

The machine according to the present invention simplifies particleboard recycling considerably by making the digesting operation unnecessary. Thus particleboard recycling becomes more economical. According to the invention chopping or shredding prior to applying simply cold water is all that is needed as preparation for recycling. Preference should be given to chopping machines which produce tension fissures in the material so that the capillary system produced can suck the water into the inner parts of the chips in order to soften the wood particles and weaken the glue joints. The swelling of the individual wood particles initiated by the cold water produces swelling strain in the composite which again loosens the structure of the board. If the chips are now passed through the machine according to the invention and it produces intensive impulses, the chips dissolve to individual wood flakes. An additional support in dissolving the material into individual flakes is rendered by the friction ring (4).

When recycling macerated and therefore plastified particleboard it is necessary to differentiate between board made with resins that are able to swell under the influence of water and those that have moisture resistant characteristics.

If particleboard to be recycled is made with resins that are able to swell when moisture is added, tools (3.4 . . . 3.6) with a large radius at their working edge are sufficient to produce a good disintegration. The large radius produces a moderate bending strain and consequently a careful preservation of the original lengths of the flakes. The air throttle is widened for this purpose in order to render an intensive air rinsing of the inner parts of the machine. This is necessary and it is an advantage of the machine according to the invention since the slightly water soluble resins produce a smear film at the inner parts of the machine if not continuously blown out by the intensive air stream.

With particleboard made with water resistant resins all options of the machine have to be exhausted. The tools (3.4 . . . 3.6) must have a small radius as high strains only can break up the glue joints. The rotation speeds of both rotor (2) and tool ring (3) must be adjusted in their upper range in order to produce high impulses. The wear plates (3.7) must be adjusted close to the friction ring (4.1) to give a small gap and execute an intensive friction.

Recycling of Automotive Composites

Composites to line the inner parts of motor cars consist mainly of fibers and a duroplastic matrix. The matrix is often foamed. After chopping -similar to that which is done with particleboard—the material is fed to the machine according to the invention. Here the duroplastic matter is pulverized due to its brittleness while the elastic or flexible fibers and other matter get separated and can be recovered by a subsequent screening or sifting operation. For this application, the friction ring (4) represents a valuable help to loosen brittle components from flexible ones.

Depithing of Sugar Cane Bagasse

Sugar cane bagasse is an excellent raw material for the manufacture of particleboard, MDF-board, pulp and paper, furfural and others. The fibers are embedded in a matrix of parenchymatic tissue. For board and pulp only the fiber can be used. For furfural the parenchymatic tissue, socalled "pith" gives the better yield. Separating fibers from pith is done in two steps according the state of the art, namley pre-depithing when still wet, then drying and subsequent defibration by wing beater mills, double stream mills or similar. As with wood flakes, the bagasse becomes brittle after drying.

When being defibrated in the mentioned mills, the fibers break transversally. Long and slender fibers cannot be achieved.

The machine according to the invention can work with any moisture content. It pulverizes the pith without breaking the fibers, if they are moist and correspondingly flexible and tough. Instead of two operations, only one is required according to the invention. And as an additional great advantage, a long fiber with good ratio of slenderness is achieved rendering much better strength properties in board manufacture.

When "depithing" (separating the parenchymatic tissue) bagasse and comparable plants, the choice of adjusting parameters depends on whether the input is dry, humid or moist or even in water suspension. For dry material, working edges (3.4 . . . 3.6) with large radius shall be employed. The rotations shall be in the order of magnitude of 500 rpm for the rotor and the tool ring. The friction ring should not be used. If, however, humid material or material in water suspension shall be processed, tools (3.4 . . . 3.6) with small radius and high rotation speeds are to be preferred. As interchangeable tools (3.4) those of large height are the better choice in order to get a high fan effect for keeping the machine housing clean. For very intensive defibration, friction ring (4.1) should be installed.

Disintegration of Cereal- and Rice Straw as well as Giant Grasses

Cereal straw and rice straw are monocotyledons like sugar cane, where the fibers are embedded in a parenchymatic matrix. The same is true of sugar cane fibers; they are brittle when dry. Their fibers are already short by nature. With machines according the state of the art, short fibers only can be produced. In contrast, with the machine according to the invention, long fibers are achieved, since the machine is able to cope with any moisture content, the same as when disintegrating bagasse. The parameters to be adjusted are basically also the same as with bagasse.

Recycling Waste Paper

According to the state of the art of gipsum-fiberboard manufacture, waste paper is first pre-disintegrated by hammer mills or their derivates and then defibered by wing beater mills, double stream mills or the like as dry matter. Both hammer mills and wing beater/ double stream mills are not able to cope with moist material. As a consequence, the length of the paper fibers is broken down due to its brittleness. Much dust is also produced and must be disposed of. With the machine according to the invention, wet waste paper can be dissolved without any risk of getting plugged.

It is well known that ordinary paper loses its strength when being wetted. It is easy to dissolve wet paper. Consequently, it suggests itself to moisten the paper after having been pre-disintegrated in order to soften the system and to execute the final defibration by the machine according to the invention at a sufficiently high moisture content required to make the fibers flexible and plastic. Thus, transversal ruptures are reduced to a minimum. Most of the fibers are separated from the paper composite without being damaged, preserving the original fiber length. Moisture is no disadvantage for the further process, since for the manufacture of recycling paper as well as for gipsum board moisture is required anyhow.

In a similar manner chemical pulp as well as mechanical pulp can be dissolved for further processing.

Moistened and thereby softened paper does not require special considerations with respect to adjusting the parameters of the machine according to the invention. The fibers are short anyhow. Due to the moisture they are flexible and do not tend to rupture. That means that any geometry of the tools or working edges (3.5) can be employed. However the throttle (6) should be opened wide to get a strong air stream for keeping the machine free from caking. Papers contain a series of additives, most of them being water soluble and producing a smeary film in the machine, ending as incrustation, if not blown out while moist.

For dissolving chemical and mechanical pulp the friction ring (4) is a useful option to intensify the disintegration.

Mixing Fibers

For the manufacture of composites it is necessary to mix fibers of different types with each other. Fiber mixing installations according to the state of the art face problems in mixing fine polymer fibers being cut to defined length. The ends of the fiber bundles are micell like comressed by the cutting knife. A normal mixer is not able to dissolve such compressions properly. In contrast, with the machine according to the invention, the compressed ends of the polymer fiber bundles are dissolved in an explosive manner by the impact of the tools and the high impulse directed into the fiber bundle. The high speed of air and the turbulences in the machine result in an extraordinarily homogenous mixing of the different types of fibers. The friction ring (4) contributes further to homgeneity.

The degree of homogeneity increases with the rotation speed of rotor (2) and tool ring (3) as well as with lower air speed and consequently longer dwell time.

Blending with Liquid and Dry Additive

Due to the fact that the machine according to the invention is not sensitive to moisture at all due to the very open circumference in combination with the high centrifugal acceleration, liquid as well as dry additives can be added with the input material to be blended together. When doing so, the liquid additive has to be added first or simultaneously, so that the solid matter can stick to the fibers.

The additive can be added by feeding it to the machine together with the main material via inlet (1.2) or via the injection for liquids (5.1) and infeed for dry additives (5.2). A third possibility exists via the channel system (4.2/4.3).

Cottonizing Raw Fibers

Disintegrating raw, thick, coarse natural fiber bundles to fine elementary fibers for spinning yarns is another field of application for the machine according invention. According to the state of the art, cottonizing is done by means of drums equipped with hundreds or thousands of fine needles or serrated saw belts on rotating drums. Such methods are damaging to the fibers. Another method is to subject the raw fibers to a chemical treatment dissolving the pectins gluing the elementary fibers together to create fiber bundles. After that the fibers are fed to a pressure vessel and exposed to steam pressure. By opening a quick action valve, the fiber bundles expand almost explosively and are disintegrated to elementary fibers. This process was first applied in the USA for fiber board manufacture and is known there as the "steam explosion process" or "Mason process". The process suffers from high cost and is therefore regressing in the USA.

Further efforts are directed to defibrating digested raw fibers by supersonic waves. The system is still in the laboratory stage.

Digested raw fibers can also be thoroughly disintegrated by means of the machine according to the invention. As mentioned, the machine can cope with any moisture content and even with materials in water suspension. So, if digested, raw fibers are passed through the machine and high impulses are applied to the material, an easy disintegration down to elementary cells is achieved at lower cost and lower energy consumption than with the steam explosion or supersonic technology.

For this purpose high rotation speeds for rotor 2 and tool ring 3 are to be adjusted. The higher the speeds, the higher the impulse applied to the material and the more complete the disintegration. Since slimy substances are produced as a result of the digestion prior to the mechanical treatment, the throttle (6.1/6.2) must be kept wide open to pass a large amount of air through the machine for keeping it clean.

Defibrating Digested Wood Chips and Chips of Renewable Raw Materials

According to the state of the art, fibers for cardboard, fiberboard, MDF-board and other products based on natural fibers are produced by chopping the material first, digesting it under steam pressure and defibrating it still under pressure by means of mills with dented discs, so-called "defibrators". But less uniform and less disintegrated fibers can also be produced with the machine according to the invention after cold chemical digestion.

No doubt, fibers produced under steam pressure with defibrators have a higher quality, but they are expensive and not very ecological due to the high energy consumption.

Fibers produced after cold chemical digestion by means of the machine according to the invention are less uniform and coarser, but they are much cheaper and more ecological, as the energy consumption is only a fraction. The quality is sufficient for composites for the outfitting of motor cars, for cardboard for packing purposes and for low density fiberboard as employed for heat insulation in construction.

Granulating and Pulverizing

Granulating or pulverizing solid fuel makes burning in boilers easier and aids combustion. Therefore, already today friction mills are employed for this purpose to serve dust fired boilers. The physical principle of such mills is shear and friction on friction elements. The material is many times recirculated along the friction ring or disc until the size is reduced sufficiently that the material can pass through screen perforations or lateral slots.

Recycling the material several times over friction elements involves a high risk of fire and even explosions, if hard foreign matter enters the machine and generates sparks. Furthermore with machines according to the state of the art, the wear of friction elements and tools is very costly. Last but not least, friction always means high energy consumption.

The entirely different working principle of the machine according invention avoids most mentioned disadvantages. Disintegration is not done by friction, but by high impulses. No friction or shear is applied in the basic machine. Consequently the energy consumption is much lower. No friction heat is generated.

The dwell time of the material in the machine according to the invention is a fraction of a second only, compared to seconds or sometimes minutes in machines according to the state of the art. There is basically only one short but very powerful impact on the material by the working edge (3.5) of the tool. Sparks can hardly be generated by foreign matter, since the impact is not accompanied by friction. Correspondingly, with the machine according to the invention, fire or explosion can hardly occur.

Granulating and pulverizing can also be done with limestone, gipsum stone, plastics and waste materials. By deep freezing, even rubber like or soft materials can be disintegrated.

The machine can also be employed for premilling of cereals, maize, seeds, or fruits. For such purposes, working edges (3.5) with small radius are to be preferred as well as high rotation speeds of rotor (2) and tool ring (3). Long dwell time helps to achieve small grain or powder like sizes, depending on material.

Cold Milling

A series of materials, especially food stuffs, pharmaceuticals, raw material with volatile and fragile ingredients lose flavor or similar characteristics when becoming hot by friction.

With the machine according to the invention, heat generation is very low due to the fact that there is no friction involved. If the friction ring (4.1) must be employed for more intensive disintegration, a cooling channel system (4.2/4.3) is provided to be installed behind the friction ring (4.1).

When disintegrating materials with sensitive flavor or fragile ingredients or similar are to be processed, the air throttle (6) should be kept wide open to take advantage of the cooling effect of the air passing through the machine. The degree of disintegration depends in the first instance on the speeds of rotor (2) and tool ring (3). The geometry of the tools is another influencing factor. For dry herbs for example a large radius will favor an explosion-like disintegration. For cereals and hard seeds a small radius and high rotation speeds are the better choice. If the resulting grain is still too coarse, the friction ring (4) should be installed to effect a subsequent milling.

List of reference numerals=

1=machine housing
1.1=front door of machine
1.2=material feeding chute
1.3=pillow block for drives
1.4=scavenging air inlet hole
1.5=material discharge
1.6=stationary shear off knife/toll
2=rotor
2.1=rotor blades
2.2=drive shaft of rotor
2.3=V-belt disc for rotor
2.4=distributing cone/disc
2.5=wear blades
2.6=shear off/cleaning knife
2.7=scavenging air generator ribb
3=tool ring
3.1=base disc
3.2=hollow wheel as drive of the tool ring 3
3.3=drive of tool ring, hydraulically or mechanically
3.4 interchangeable tool, variabale in height and geometry
3.5=interchangeable working edge, changeable in geometry
3.6=large tool carrier, welded in
3.7=upset and wear plate, replaceable
3.8="open circumference" in %=ratio of free passage between 2 tools and distance between the center lines of the 2 tools
3.9=counter ring of tool ring
3.10=connecting ring to base disc 3.1
3.11 scavenging air generator ribb at base disc 3.1
4=upset an friction ring, stationary
4.1=friction ring
4.2=channel system for pressure air, cooling or drying air
4.3=perforations in friction ring as continuation of the channel system 4.2
5=feeding systems for additives
5.1=feeding system for liquid additives
5.2=feeding system for solid/powder additives
6=air throttle
6.1=pull in belt, upper or lower
6.2=cross section adjustment, upper or lower
7=toll pressure cleaning
7.1=device for toll cleaning by pressure air or liquid

What is claimed is:

1. A device mechanically for processing materials or compounds, comprising:

a rotor mounted for rotation about an axis;

a tool ring surrounding said rotor, radially spaced from said rotor, and mounted for rotation about the axis; and a distributor disposed for receiving materials or compounds that are fed to said device and for distributing the materials or compounds in a radial direction to said rotor, wherein:

said rotor comprises a plurality of radially extending blades constructed to radially accelerate and propel the materials or compounds such that the materials or compounds undergo flight outwardly toward said tool ring;

said tool ring has a circumference and comprises a plurality of tools each having a working edge, said working edges being disposed to intercept the materials or compounds in flight from said rotor when said tool ring is rotating for impacting against the materials or compounds and causing the materials or compounds to be bent around said working edges; and said tools are spaced apart around said circumference of said tool ring by distances such that a major portion of said circumference is open to assure an unhindered discharge of the materials or compounds after impact with said working edges.

2. The device of claim 1 wherein said plurality of tools comprises a first category of tools permanently secured to said tool ring and a second category of tools removably connected to said tool ring.

3. The device of claim 2 wherein said tools of said first category have a wedge shape.

4. The device of claim 2 wherein said tools of said first category are equipped with interchangeable working edges or wear plates.

5. The device of claim 2 wherein said working edges of different ones of said tools have respectively different heights selected to cause at least one of a given air quantity and a given air velocity to be established through said device when said rotor and said tool ring are rotating at selected speeds.

6. The device of claim 2 wherein said tools of said second category have basically the same shape as said tools of said first category.

7. The device of claim 2 wherein said tools of said first category are interspersed with said tools of said second category around the circumference of said tools ring.

8. The device of claim 1 wherein the materials or compounds are processed in a manner determined by at least one of the rotation speed of said rotor; the rotation speed of said tools ring; and the velocity of air flow through said device.

9. The device of claim 1 further comprising an air throttle composed of at least one feed belt disposed ahead of said distributor.

10. The device of claim 1 wherein said rotor further comprises at least one shear-off tool mounted on at least one of said blades to cooperate with said tools on said tool ring to prevent build-up of processed materials or compounds on said working edges of said tools.

11. The device of claim 1 further comprising a stationary part having at least one tool disposed for preventing build-up of processed materials or compounds on said blades.

12. The device of claim 1 further comprising an upset friction ring surrounding said tool ring to cooperate with said tools to subject the processed materials or compounds to further processing.

13. The device of claim 1 further comprising a blowing unit disposed for cleaning said tools.

14. The device of claim 1 wherein more than one-half of said circumference of said tool ring is open.

* * * * *